(12) United States Patent
Ernst

(10) Patent No.: US 6,588,578 B1
(45) Date of Patent: Jul. 8, 2003

(54) CONVEYOR GUIDERAIL SNAG RESISTANT OPENING

(76) Inventor: Ronald L. Ernst, 640 Springdale, Belleville, IL (US) 62223

( * ) Notice: Subject to any disclaimer, the term of this patent is extended or adjusted under 35 U.S.C. 154(b) by 0 days.

(21) Appl. No.: 10/079,296

(22) Filed: Feb. 20, 2002

(51) Int. Cl.[7] .................. B65G 43/00; B65G 47/00; B65G 13/06
(52) U.S. Cl. .................. 198/502.1; 198/781.06; 198/810.01
(58) Field of Search .................. 198/502.1, 464.2, 198/781.06, 781.05, 810.01

(56) References Cited

U.S. PATENT DOCUMENTS

| | | | |
|---|---|---|---|
| 5,201,397 A | * | 4/1993 | Isaacs .................. 198/502.2 |
| 5,582,286 A | * | 12/1996 | Kalm et al. .................. 198/781.06 |
| 6,253,909 B1 | * | 7/2001 | Kalm et al. .................. 198/781.06 |
| 6,474,463 B1 | | 11/2002 | Wölfel |
| 6,475,130 B1 | | 11/2002 | Simmons |

* cited by examiner

*Primary Examiner*—Christopher P. Ellis
*Assistant Examiner*—Gene O. Crawford
(74) *Attorney, Agent, or Firm*—Polster, Lieder, Woodruff & Lucchesi, LC

(57) ABSTRACT

A conveyor guiderail snag resistant opening for use in a conveying system which is transporting irregular materials such as newspaper bundles. The snag resistant opening includes a sensor opening for use by optical sensors utilized in the monitoring of the irregular material on the conveyor system. The snag resistant opening has a unique shape which reduces the likelihood that the irregular material on the conveyor system will become jammed at the sensor opening or that the edges of the sensor opening will cause damage to the irregular material, or that the sensor opening will become blocked by snagged material.

13 Claims, 2 Drawing Sheets

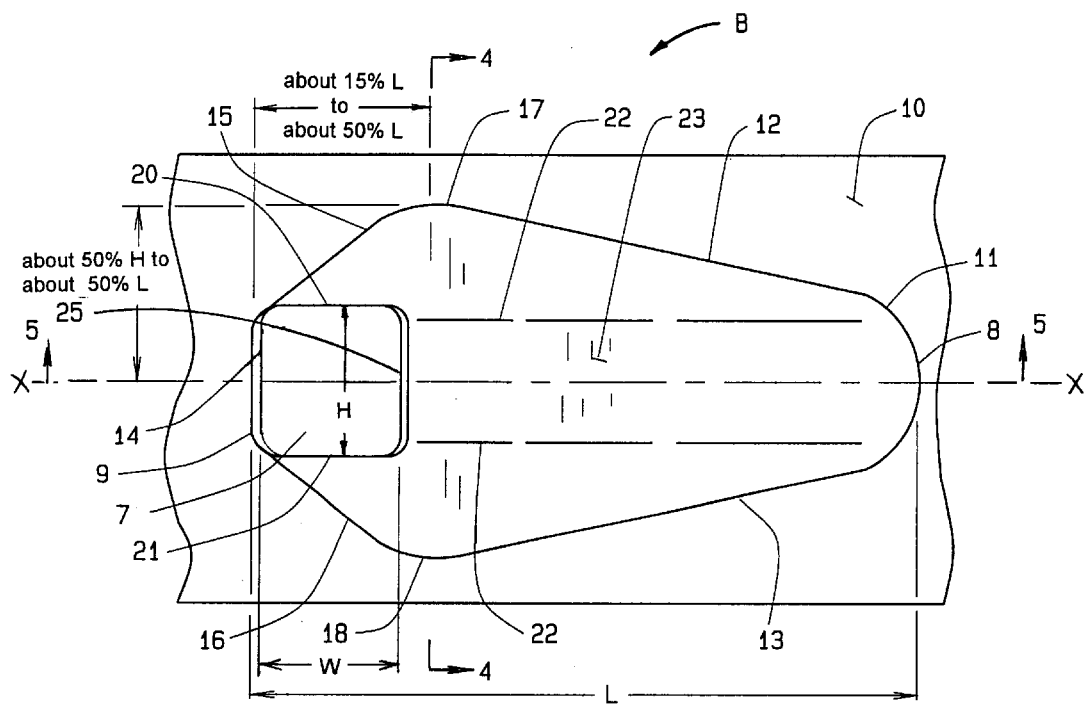
FIG.3
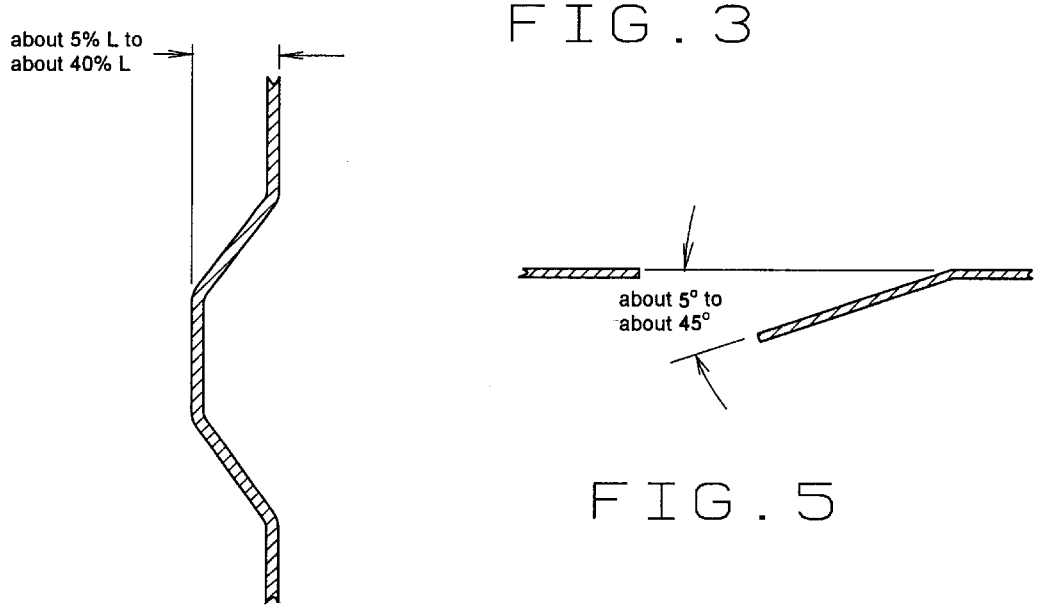
FIG.4
FIG.5

US 6,588,578 B1

CONVEYOR GUIDERAIL SNAG RESISTANT OPENING

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

This invention relates in general to a conveyor guiderail snag resistant opening and, more particularly, to a conveyor guiderail snag resistant opening for use in devices which transport irregular items such as bundled newspapers or newsprint.

2. Description of Related Art

Automated conveying systems normally utilize some form of sensing device to detect the presence of transported articles on the conveying system. While lever operated switches can be used as the sensing device for these systems, optical switches represent the type of sensing device used on a wide variety of conveying systems. When such optical sensing switches are used, the guiderails of the conveyor assembly usually have openings through which optical sensing devices may transmit and receive optical signals.

Prior art teaches that the opening for such optical sensing devices may be of any shape as long as the opening allows the communication of an optical signal across the conveyor track. In most cases, the size and shape of the sensor openings are simply round, square, or elliptical, and are sized such as to allow optical communication. These types of openings are also simply placed into the guiderails of conveyor systems by punching holes in the guiderails. This type of fabrication results in a sensor opening where all edges of the opening are flush with the inside surface of the guiderail. That is, the entire perimeter of the sensor opening is on the surface of the guiderail and no portion of the sensor opening is depressed into the surface of the guiderail.

When the conveyor is transporting boxes or other types of packaged items, these types of square, round, or elliptical openings that are made flush with the inside surface of the guiderail do not interfere with the movement of those items on the conveyor system and do not damage the transported items. However, these types of openings are prone to cause damage to certain irregular items being transported on a conveying system. In particular, the transport of stacks of newspaper and other such items on conveying systems which have square, round, or elliptical openings will cause the sharp edges of those openings to snag the paper in the bundle.

An example of this problem is found in the transport of newspaper material on a conveyor system. In that situation, the newsprint is susceptible to catching and tearing. Additionally, the newspapers on the conveyor system are placed on the conveyor such that the edges of the newspaper will often be against the guiderails of the conveyor. There is a tendency for the edges of the newspaper bundles or protruding corners of individual papers to catch in the sensor opening, either stopping the bundle or tearing the papers, with torn paper pieces sometimes blocking the sensor opening and preventing the sensor from functioning properly.

Thus, this placement of the newspapers on the conveyor track causes the edges of the newspaper to push into the optical sensor openings in the guiderails. When this occurs, the opening can either grab and retain the paper on the conveying system to cause a jam on the conveyor, or the sharp edges of the opening can actually tear the paper being transported on the conveyor. In either case, the end result is that the conveyor system is not functional.

Traditionally, prior art has attempted to rectify this problem by depressing all edges of the sensor opening or by placing the sensor opening in the center of a tapered or dimpled hole. Each of these attempted remedies have met with only limited success.

SUMMARY OF THE INVENTION

The present invention overcomes these and other problems by providing a uniquely configured opening which allows the transport of irregular paper materials while limiting the jamming tendencies and reducing the tendency of the opening to tear the paper on the conveyor system.

Therefore, the present invention resides in a conveyor guiderail snag resistant opening (hereinafter "snag resistant opening") which allows for the passage of irregular materials, such as newsprint and loose paper, to protrude into the snag resistant opening without jamming, snagging, or tearing the loose materials. More specifically, the present invention resides in a sensor opening having a unique configuration which forms a depression in a guiderail of a conveyor system such that stray materials are able to enter and leave the depression without jamming on the conveyor track and without damage to the materials being transported.

The present invention also resides in various embodiments of the above invention where snag resistant openings can be used to prevent damage to irregular materials passing near the snag resistant opening.

Therefore, it is an object of the invention to provide a snag resistant opening manufactured in a unique shape which can be used on a conveying system where cutouts are needed in the guiderails of the conveying system to allow sensors, including optical sensors and infrared sensors, to detect the presence and movement of materials being transported on the conveying system.

Other objects and features of the present invention will be in part apparent and in part pointed out hereinafter.

DESCRIPTION OF THE DRAWINGS

FIG. 3 is a front view of the snag resistant opening.

FIG. 4 is a vertical sectional view of the snag resistant opening taken along line 4—4 of FIG. 3.

FIG. 5 is a horizontal sectional view of the snag resistant opening taken along line 5—5 of FIG. 3.

Corresponding reference characters indicate corresponding parts throughout the several views of the drawings.

DETAILED DESCRIPTION OF THE INVENTION

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

Figure 1:
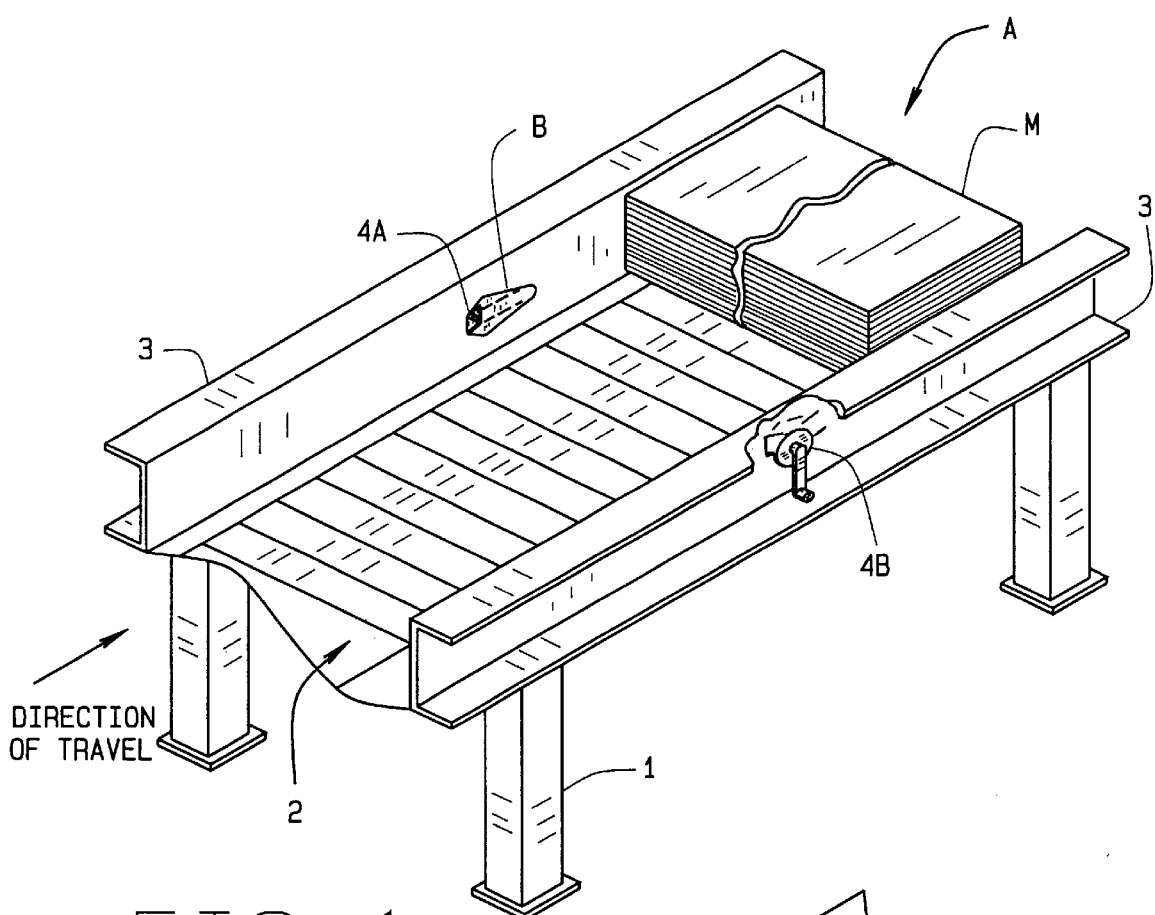
FIG. 1 is a perspective view of a conveyor system showing the snag resistant opening in the guiderails.

Referring now to the drawings, FIG. 1, a conveyor system A is shown. The conveyor system A includes a frame 1, a conveying track 2, and two guiderails 3. The frame 1 supports the conveying track 2 and the two guiderails 3, and also supports the material M being transported on the conveying system A. FIG. 1 shows a typical conveying system A and the relationship between the frame 1, the conveying track 2, and the two guiderails 3. It will be appreciated that while the drawings depict a particular configuration of frame, conveying track and guiderails, the design of the these three components is not a required element of the present invention, and are shown for illustrative purposes only.

The typical guiderail 3 is generally channel shaped to provide strength to the frame 1, to allow for installation of various types of supports for the conveying track, and to allow for various types of electromechanical components and pneumatic control components to be mounted. These components traditionally depend on the inputs of various sensing devices in order to operate the conveying system in accordance with the requirements of the conveying system's design. The sensing devices are used to detect various operating parameters for the conveying system, including such parameters as the presence of transported material and the movement of the material being transported.

Figure 2:
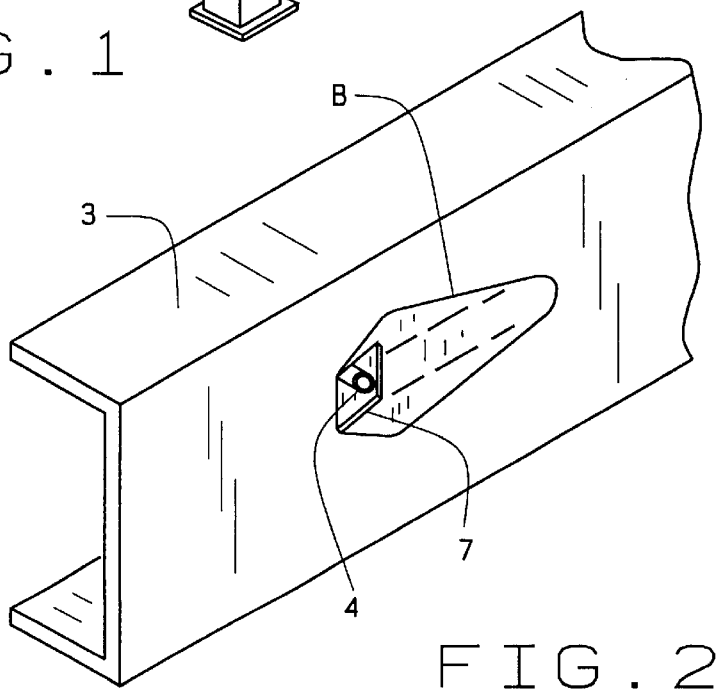
FIG. 2 is a perspective view showing a close-up of the snag resistant opening in the guiderail.

FIG. 2 illustrates a typical optical sensing device 4 which has been installed behind the two guiderails 3. A typical optical sensing device consists of an emitter/receiver component 4A and a reflector component 4B. In operation, the optical sensing device 4 detects the presence of an item on the conveying track 2 and produces a signal which is transmitted to a system controlling device (not shown) which controls the overall operation of the conveying system A. The system control device can control the functions of the speed and accumulation of items on the conveyor by detecting the presence or absence of items on the conveyor, and by calculating the length of time a particular optical sensing device detects the continued presence of an item at a particular point on the conveying track.

In order for the optical sensing device 4 to transmit the signal, however, the optical sensing device must be mounted in a manner which allows it to function properly. To function properly, the emitter/receiver component 4A is normally mounted behind the first of the two guiderails 3 and the reflector component 4B is mounted behind the second of the two guiderails 3. Because there must be a clear optical path between the emitter/receiver component 4A and the reflector component 4B, sensor openings 7 are cut into each of the two guiderails 3, with one sensor opening 7 in the guiderail 3 in which the emitter/receiver component 4A is mounted behind, and another sensor opening 7 in the other guiderail where the reflector component 4B is mounted. Typically, these openings are square, round, or elliptical in shape with the edges of the openings being flush with the surface of the guiderail. However, the geometry of these shapes can create abrupt and sometimes sharp edges in the material used to manufacture the guiderails 3. As a result, the openings tend to interfere with the passage of irregular items being transported on the conveying track 2. This interference can cause jams on the conveyor or sharp edges can tear the paper items, with torn paper sometimes blocking the sensor opening.

As can be seen in FIG. 2, the present invention discloses a unique geometry for the sensor openings which greatly reduces the possibility that the paper materials will be jammed, cut, or damaged by the sensor opening.

More specifically, FIG. 3 shows a front view of a snag resistant opening B and illustrates the special shape required for the snag resistant opening. The snag resistant opening B includes a special geometric shape which is located in a guiderail 3 of a conveying system. The snag resistant opening B is placed into the guiderail 3 by creating a depression in the guiderail which has the unique geometric shape as shown.

The alignment of the snag resistant opening B is such that the items being transported on the conveying system travel from a leading edge 9 to a trailing edge 8. A horizontal centerline X extends from the leading edge 9 to the trailing edge 8. The trailing edge 8 of the snag resistant opening B is flush with the guiderail inside surface 10 and has an arcuate end 11. A first top bend 12 extends from the arcuate end 1 1 and is inclined upwardly from the horizontal centerline X. A first bottom bend 13 also extends from the arcuate end 11, but extends downwardly from the horizontal centerline X.

The leading edge 9 is centered on the horizontal centerline X and is flush with the guiderail inside surface 10. The leading edge 9 has a curve at the top and bottom corners. A second top bend 15 extends from the top curve of the leading edge 9 and is inclined upwardly from the horizontal centerline X. A second bottom bend 16 extends from the bottom radius of the leading edge 9, but extends downwardly from the horizontal centerline X. The first top bend 12 and the second top bend 15 converge at a first rounded section 17. The first bottom bend 13 and the second bottom bend 16 converge at a second rounded section 18. The first rounded section 17 and the second rounded section 18 are in substantial vertical alignment at a distance of about 15% to about 50% of the dimension L from the leading edge 9. The first rounded section 17 is located above the centerline X at a distance of from between about 50% of the height H of the sensor opening and about 50% of the dimension L. The second rounded section 18 is located below the centerline X at about the same distance the first rounded section is located from the centerline X. Although the first and second top bends 12 & 15 and the second bottom bends 13 & 16 are shown generally as straight lines in the current embodiment, all four of these bends may also be arcuate and still be within the scope of the invention.

The sensor opening 7 is located near the leading edge 9 and is sized as required to allow for proper operation of the optical sensor used in the conveyor system A. In the embodiment shown, the sensor opening 7 is a square opening having a dimension of about 1.50 inches per side and having radiused corners. In another embodiment, the sensor opening 7 is simply square. It will be appreciated that various other opening shapes, such as round, elliptical, rectangular, or irregular sensor openings of various other sizes may also be used without deviating from the present invention. In any embodiment, however, the sensor opening will have a height H and a width W. The sensor opening 7 is centered on the horizontal centerline X and has a leading edge point 14, a top edge point 20, and a bottom edge point 21. While FIG. 3 shows the leading edge 9 to be offset from the leading edge point 14 of the sensor opening 7, in other embodiments the leading edge and the leading edge point may also coincide, with the leading edge point being located at the leading edge.

Two intermediate bends 22 extend substantially horizontally from near the top edge point 20 and the bottom edge point 21 of the sensor opening 7 until the intermediate bends merge with the arcuate end 11 on the trailing edge 8 of the louver opening B. An intermediate surface 23 is defined by the two intermediate bends 22, the arcuate end 11, and a second vertical edge 25 of the sensor opening 7. The intermediate surface 23 is located at an angle of between about 5 degrees to about 45 degrees in relation to the guiderail inside surface 10. The sensor opening 7 is depressed into the guiderail such that the second vertical edge 25 of the sensor opening is depressed to a depth of between about 5% and about 40% of the dimension L from the guiderail inside surface 10. The top edge point 20 and the bottom edge point 21 of the sensor opening 7 slant upward from the depressed area toward the guiderail inside surface 10 and from the second vertical edge 25 until the top edge point 20 and the bottom edge point 21 intersect with the guiderail inside surface 10.

It will be appreciated that the while the preferred embodiment of the present invention is shown in the illustrations, various changes can be made to the general shape of the snag resistant opening B without departing from the concept of the present invention. For example, the overall length L of the snag resistant opening B may be shortened or lengthened to coordinate with the specific type of loose material or items being transported on the conveyor system A so long as the dimension L is more than twice the width W of the sensor opening 7. Also, the intermediate surface 23 may be replaced with a curved surface having a depth of between about 5% and about 40% of the dimension L from the guiderail inside surface 10.

While the above description describes various embodiments of the present invention, it will be clear that the present invention may be otherwise easily adapted to fit any configuration where a sensor opening may be utilized.

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed is:

1. A snag resistant opening for a conveyor system, comprising:
   a geometric shape in at least one guiderail of a conveyor system, the geometric shape being located into the guiderail, said geometric shape having a longitudinal dimension of L; and
   a sensor opening in the guiderail, the sensor opening being located within the geometric shape, said geometric shape having a leading edge and a trailing edge with the conveyor system moving items from the leading edge to the trailing edge, the sensor opening being located near the leading edge and the geometric shape being depressed from a guiderail longitudinal surface such that it defines an interior surface which is inclined from the trailing edge to the sensor opening to define one lateral edge thereof, and side walls which connect the interior surface to the said guiderail longitudinal surface and define the longitudinal edges of the sensor opening.

2. The snag resistant opening of claim 1 wherein the interior surface of the geometric shape is depressed from the guiderail longitudinal surface at an angle of between about 5 degrees to about 45 degrees in relation to the guiderail longitudinal surface.

3. The snag resistant opening of claim 2 wherein the sensor opening is a shape selected from the group consisting of a square, a circle, an ellipse, or an irregular shape.

4. The snag resistant opening of claim 3 wherein the sensor opening includes a first vertical edge, a second vertical edge, a top edge point, a bottom edge point, a height H, and a width W, said geometric shape being depressed in the guiderail such that the second vertical edge of the sensor opening is depressed from the guiderail longitudinal surface to a depth of about 5% to about 40% of the dimension L.

5. The snag resistant opening of claim 4 wherein the geometric shape includes the leading edge, the trailing edge, a horizontal centerline X, a first top bend, a first bottom bend, wherein the leading edge has a top point and a bottom point, and wherein the trailing edge is an arcuate end, and wherein the first top bend and the first bottom bend intersect with the arcuate end, and wherein the horizontal distance between the leading edge and the arcuate end is a dimension L, said dimension L being at least twice the width W of the sensor opening.

6. The snag resistant opening of claim 5 further including a second top bend and a second bottom bend, wherein the first top bend and the second top bend intersect at a first rounded section located at a distance of between about 50% of dimension H and about 50% of dimension L above the horizontal centerline, the first rounded section being between the second vertical edge and the arcuate end, and at a dimension of about 15% to about 50% of dimension L from the leading edge, and wherein the first bottom bend and the second bottom bend intersect at a second rounded section located at a distance of between about 50% of H dimension and about 50% of dimension L below the horizontal centerline, the second rounded section being between the second vertical edge and the arcuate end, and at a dimension of about 15% to about 50% of dimension L from the leading edge, the second top bend extending from the top point of the leading edge and in an upwardly direction from the horizontal centerline X, the second bottom bend extending from the bottom point of the leading edge and in a downwardly direction from the horizontal centerline X.

7. The snag resistant opening of claim 6 further comprising a first intermediate bend and a second intermediate bend, said first intermediate ben d being substantially horizontal and located between the top edge point of the sensor opening and the arcuate end, and said second intermediate bend being substantially horizontal and located between the bottom edge point of the sensor opening and the arcuate end, and further including an intermediate surface which is defined by the first intermediate bend, the second intermediate bend, the second vertical edge of the sensor opening, and the arcuate end.

8. The snag resistant opening of claim 7 wherein the intermediate surface is substantially flat.

9. The snag resistant opening of claim 7 wherein the intermediate surface is substantially curved.

10. A snag resistant opening for a conveyor system, comprising:
    a geometric shape in at least one guiderail of a conveyor system,
        the geometric shape having a sensor opening, the sensor opening having a first vertical edge, a second vertical edge, a top edge point, a bottom edge point, a height H, and a width W, said sensor opening having a shape selected from the group consisting of a square, a circle, an ellipse, or an irregular shape;
        the geometric shape also having a horizontal centerline X, an arcuate end, a first top bend, a first bottom bend, a leading edge having a top point and a bottom point, a second top bend, and a second bottom bend, wherein the distance from the leading edge to the arcuate end being a dimension L, the dimension L being at least twice the width W of the sensor opening;

the first top bend extending from the arcuate end and in an upwardly direction from the horizontal centerline X;

the first bottom bend extending from the arcuate end and in a downwardly direction from the horizontal centerline X;

the second top bend extending from the top point of the leading edge and in an upward direction from the horizontal centerline X;

the second bottom bend extending from the bottom point of the leading edge and in a downwardly direction from the horizontal centerline X;

the first top bend and the second top bend intersecting at a first rounded section located at a distance of between about 50% of dimension H and about 50% of dimension L above the horizontal centerline X, the first rounded section being between the second vertical edge of the sensor opening and the arcuate end, and at a dimension of about 15% to about 50% of dimension L from the leading edge;

the first bottom bend and the second bottom bend intersecting at a second rounded section located at a distance of between about 50% of dimension H and about 50% of dimension L below the horizontal centerline X, the second rounded section being between the second vertical edge of the sensor opening and the arcuate end, and at a dimension of about 15% to about 50% of the dimension L from the leading edge;

the geometric shape being depressed in the guiderail such that the second vertical edge of the sensor opening is depressed from guiderail longitudinal surface the to a dimension of about 5% to about 40% of the dimension L; and a sensor opening in the guiderail, the sensor opening being located within the geometric shape.

11. The snag resistant opening of claim 10 further comprising a first intermediate bend and a second intermediate bend, said first intermediate bend being substantially horizontal and located between the top edge point of the sensor opening and the arcuate end, and said second intermediate bend being substantially horizontal and located between the bottom edge point of the sensor opening and the arcuate end, and further including an intermediate surface which is defined by the first intermediate bend, the second intermediate bend, the second vertical edge of the sensor opening, and the arcuate end.

12. The snag resistant opening of claim 11 wherein the intermediate surface is substantially flat.

13. The snag resistant opening of claim 11 wherein the intermediate surface is substantially curved.

* * * * *

UNITED STATES PATENT AND TRADEMARK OFFICE
CERTIFICATE OF CORRECTION

PATENT NO.    : 6,588,578 B1
DATED         : July 8, 2003
INVENTOR(S)   : Ronald L. Ernst It is certified that error appears in the above-identified patent and that said Letters Patent is hereby corrected as shown below:

Column 6,
Line 43, replace "ben d" with -- bend --

Signed and Sealed this

Sixth Day of January, 2004

JAMES E. ROGAN
*Director of the United States Patent and Trademark Office*

UNITED STATES PATENT AND TRADEMARK OFFICE
CERTIFICATE OF CORRECTION

PATENT NO. : 6,588,578 B1
DATED : July 8, 2003
INVENTOR(S) : Ronald L. Ernst

It is certified that error appears in the above-identified patent and that said Letters Patent is hereby corrected as shown below:

<u>Title page,</u>
Insert Item -- [73] Assignee:  Alvey Systems, Inc.
St. Louis, Missouri --

Signed and Sealed this

Sixth Day of April, 2004

JON W. DUDAS
*Acting Director of the United States Patent and Trademark Office*